(12) United States Patent
Schwertberger

(10) Patent No.: US 6,520,886 B2
(45) Date of Patent: Feb. 18, 2003

(54) GENERATOR DRIVE

(75) Inventor: Helmut Schwertberger, Augsburg (DE)

(73) Assignee: Renk Aktiengesellschaft, Augsburg (DE)

(*) Notice: Subject to any disclaimer, the term of this patent is extended or adjusted under 35 U.S.C. 154(b) by 0 days.

(21) Appl. No.: 09/828,096

(22) Filed: Apr. 6, 2001

(65) Prior Publication Data

US 2001/0031683 A1 Oct. 18, 2001

(30) Foreign Application Priority Data

Apr. 8, 2000 (DE) .......................... 100 17 548

(51) Int. Cl.$^7$ .............................. F16H 57/08
(52) U.S. Cl. ............................. 475/338; 74/413
(58) Field of Search .................. 74/413, 421 A, 74/665 L, 665 M, 665 N, 665 B, 665 C, 665 D, 665 G, 665 GA, 665 S; 475/159, 338, 348

(56) References Cited

U.S. PATENT DOCUMENTS

| | | | | |
|---|---|---|---|---|
| 2,448,249 A | * | 8/1948 | Bonham | 475/47 |
| 3,147,635 A | * | 9/1964 | Fisher | 475/34 |
| 3,808,913 A | * | 5/1974 | Gilbert et al. | 475/159 |
| 4,105,372 A | * | 8/1978 | Mishina et al. | 415/122.1 |
| 4,114,468 A | * | 9/1978 | Carpentier | 74/410 |
| 4,278,928 A | * | 7/1981 | Griffiths et al. | 322/29 |
| 4,435,990 A | * | 3/1984 | Chalmers | 192/88 A |
| 5,261,289 A | * | 11/1993 | Birch et al. | 74/413 |
| 5,816,102 A | * | 10/1998 | Kern et al. | 290/1 A |
| 6,053,840 A | * | 4/2000 | Jones | 475/248 |
| 6,058,793 A | * | 5/2000 | Pasley et al. | 184/6.12 |

FOREIGN PATENT DOCUMENTS

DE     1 985 822     5/1968

OTHER PUBLICATIONS

Article entitled "Überlegungen zur Konstruktionsarbeit am Beispiel eines Turbopllanetengetriebes" by Von Klaus Ehrlenspiel, Sonthofen, appearing in VDI–Z 113 (1971) Nr. 2—Feb., pp. 106–110.

* cited by examiner

Primary Examiner—Rodney H. Bonck
Assistant Examiner—David D. Le
(74) Attorney, Agent, or Firm—Cohen, Pontani, Lieberman & Pavane

(57) ABSTRACT

A generator drive for matching the rotation speed of a gas turbine to an electricity generator, The drive from the gas turbine is introduced by a sun wheel into planet gears of a first epicyclic gear stage and is driven via further planet gears of a second epiclyic gear stage, which are each arranged on a common planet gear shaft with the planet gears of the first gear stage, by an annular gear to the generator. The planet gear shafts are mounted in bushes which can each be inserted complete with the planet gears into openings on a supporting wall of the drive. With respect to their distances from the bearing, the planet gears are arranged on the planet gear shaft such that the moments which result from the circumferential forces about the bearing essentially cancel one another out.

3 Claims, 1 Drawing Sheet

GENERATOR DRIVE

BACKGROUND OF THE INVENTION

The invention relates to a high-speed generator drive for matching the rotation speed of a gas turbine to an electricity generator.

It is generally known for a two-stage epicyclic gear to be arranged between the output driveshaft from a gas turbine and an electricity generator, in order to reduce the high output speed of the gas turbine and to match it to the electricity generator.

For this purpose, two epicyclic gear stages are arranged one behind the other and are connected to one another by a coupling. The planet gears are in this case mounted in a planet support, either on both sides in the form of a cage or, for low power levels, also such that they are floating.

Reduced epicyclic gears, as they are referred to, which manage with a reduced number of elements, are also known. A sun wheel in this case engages in planet gears on each of whose shafts a further planet gear is arranged axially offset, and these together form a further planet set, which engages with an annular gear. The planet supports of the two epicyclic gear sets are each designed in the form of cages and are assembled to form a common web. This expensive, two-element configuration, which is complicated to assemble, is required in order to allow the tooth engagement forces of the planet gears in the annular gear to be supported via the bearings which are mounted in the planet support. This configuration also makes it harder to service the drive system.

SUMMARY OF THE INVENTION

Against this background, the object of the present invention is to provide a two-stage epicyclic gear which has a simple design, is easy to install and in which the system is easy to service.

The particularly advantageous arrangement according to the invention allows the gearwheels in the two epicyclic gear sets to be preinstalled on a common shaft and the tooth edges can simply be aligned with one another in an assembly apparatus, so that the complex adjustment process during assembly is avoided. This allows the drive to be installed particularly easily and without any complications.

The arrangement according to the invention allows the moments of the circumferential forces of the two epicyclic gear sets about the center bearing to be matched to one another. As a result, only a small bearing, to absorb the radial forces, now needs to be provided on the planet gear shafts.

The particularly advantageous design according to the invention simplifies in particular the installation, maintenance, stockholdings and replacement of essentially simple standardized parts and completely preassembled units.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
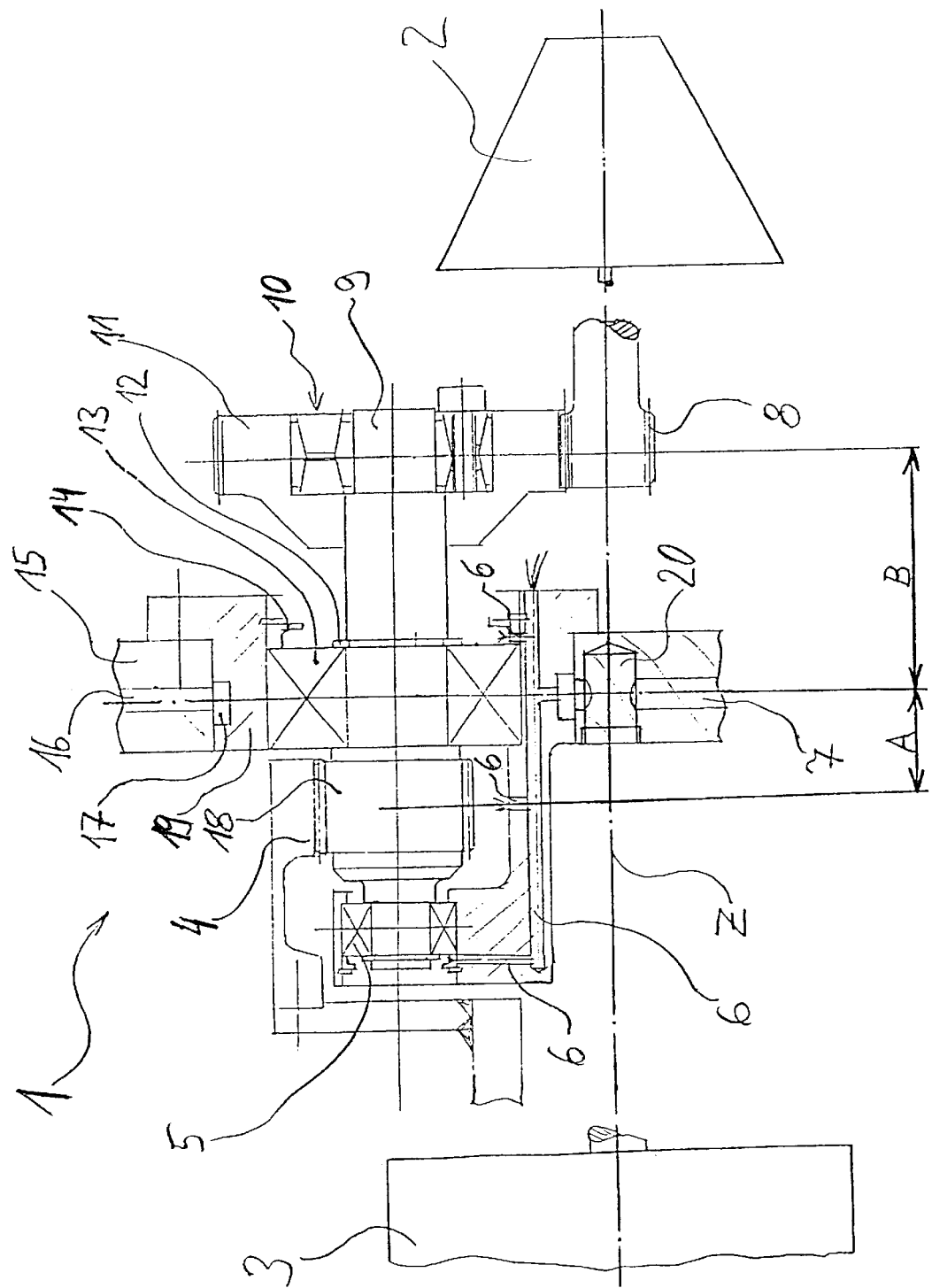
FIG. 1 shows a section through an exemplary embodiment in the plane of a planet gear shaft.

The illustration shows, symbolically, a gas turbine (2) which is conventional and will therefore not be described in any more detail, and an electricity generator (3), which is likewise conventional and will not be explained in any more detail, with an electrical rating of about 100 to 120 kilowatts. The gas turbine (2) and the generator (3) are connected to the generator drive (1) in a generally known manner via shaft couplings or other means.

The drive power is passed from the input shaft of the generator drive (1), which is connected to the gas turbine (2), via a sun wheel (8) to a number of planet gears (11) of a first drive stage. In the illustrated embodiment, three planet gears (11) are preferably used. With different gear ratios, it is also possible to use four or even more planet gears, by which means the power is split into smaller amounts and the individual components can thus be designed to be smaller and can be produced more easily, thus resulting overall in a more economic design.

The planet gears (11) are preferably arranged with a friction-fitting shaft/hub connection, preferably with an annular spring tensioning device, such as a compression joint (10) at one end of a planet gear shaft (9). A further planet gear (18) of a further transmission stage is arranged on each of these planet gear shafts (9). The planet gears (18) in this further drive stage engage in an annular gear (4) via which the drive power is emitted to the generator (3). The annular gear (4) can, for example, be arranged directly on the input shaft of the generator (3), so that the annular gear shaft does not need to have its own bearing. However, it is also possible for the annular gear (4) and/or the annular gear shaft to be provided with their or its own bearing. The sun wheel (8) is preferably mounted in a floating manner between the planet gears (11).

The planet gear shaft (9) is supported between the planet gears (11, 18) by means of a bearing (13) which is introduced into a bush (19) and is secured by means of a locking ring (12) via an intermediate ring (14). The distances between the planet gears (11, 18) and the center plane of the bearing (13) are chosen such that the moments which are produced by the various circumferential forces on the tooth engagement points (8, 11; 18, 4) and which act on lever arms (A, B) essentially cancel one another out. A bearing (5) is provided at the end of the planet gear shaft (9) facing the annular gear (4), and this bearing (5) now need absorb only the radial forces of the tooth engagements (8, 11; 18, 4) and, possibly, any small residual moment from the circumferential forces. Owing to its relatively low load, this bearing (5) has a very small external diameter and also requires only a small holder. It is thus particularly advantageously possible to dispense with a planet support at this point, and the bearing (5) can be accommodated in the same bush (19) as that which supports the bearing (13).

The bushes (19) are fitted with their cylindrical external shapes into holes on a supporting wall (15) of the drive housing, and are each fixed by means of a flange at the side on the supporting wall (15). Depending on the size of the drive, it may be necessary to cut out those regions of the flanges which face one another centrally. On their outer surfaces which are introduced into the hole, the bushes (19) each have a circumferential groove (17), which is aligned with an oil supply hole (16) in the supporting wall (15).

Preferably concentrically with respect to the external circumference, the bush (19) has a cylindrical opening for accommodating the bearing (13) and, on the side facing the annular gear (4), the bush (19) is lengthened by means of a cantilever arm which supports the small bearing (5). The individual bushes (19) are fitted into the openings on the supporting wall (15) such that, with respect to their rotation direction, their cantilever arms each radially face the main axis (Z) of the generator drive (1). The cantilever arms are designed such that they provide adequate support for the bearing (5) and such that the annular gear (4) can be pushed over them and can engage with the planet gears (18).

The cantilever arm furthermore has lubricating oil holes (6) which are supplied with lubricating oil via the circumferential groove (17) and the oil supply hole (16). At the bearing points (5, 13) on the side facing the planet gear (18) and in the direction in which the teeth engage between the sun wheel (8) and the respective planet gear (11), the lubricating oil holes (6) each have openings or nozzles through which these lubrication points are supplied with oil. The oil is distributed to all the bushes (19) arranged around the main axis (Z) of the drive via a hole (20) in the supporting wall (15), whose open end is sealed by a plug and to which a transverse hole runs from each bush (19). Originating from the hole (20), a further oil supply hole (7) can connect further lubrication points within the drive housing to the central oil supply.

The advantageous arrangement of the planet gears (11, 18) on the planet gear shaft (9) makes it possible to dispense with expensive planet supports, since the relatively small bearing (5) can be accommodated in the bush (19). The planet gear shafts (9) with the preferably milled planet gears (18) can be preassembled with their bearings (5, 13) in the bushes (19), the second planet gear (11) can in each case be adjusted and can be secured, for example, by means of an annular spring tensioning device. This assembly can then in each case be introduced, as a complete entity and without any further adjustment work, into the hole on the supporting wall (15), and can be secured there. In the illustrated embodiment, three corresponding holes are arranged distributed uniformly around the main axis (Z) of the drive on the supporting wall (15), and such a preassembled assembly is introduced into each of them.

However, depending on the gear ratio and the design, it is also possible to provide a greater number of correspondingly preassembled bushes (19) in holes on the supporting wall (15).

In order to achieve a uniform load-bearing pattern of the planet gears (11, 18) at all the tooth engagement points of the two epicyclic gear stages, an assembly apparatus is preferably used, which fixes the corresponding relative position of the tooth edges of the first (11) and second (18) planet gear on the planet gear shaft (9) while the compression joint is being produced on the fitted planet gear (11). In the case of epicyclic gears which are designed in the form of cages, the adjustment work for the fixed annular gear must be carried out during the assembly process within the drive housing, which represents major complexity.

In the illustrated embodiment designed according to the invention, the annular gear (4) can be pulled off axially without any installation effort. It is thus possible to arrange the annular gear (4) directly at the shaft end of the generator (3), for example on a flange, to insert the generator drive (1) with the planet gears (18), and to secure it to the housing of the generator (3).

The installation, maintenance, stockholdings and replacement of parts are considerably simplified by the particularly advantageous design comprising simple standardized parts and preassembled units, such as the bushes (19) with the preadjusted planet gears (11, 18).

The illustrated generator drive (1) provides a gear ratio of 15.16:1 by which means a speed of 55 000 revolutions per minute of the gas turbine (2) is matched to 3 600 revolutions per minute for the generator (3), which produces an alternating current at a frequency of 60 Hertz.

However, input speeds of up to more than 100 000 revolutions per minute and gear ratios from 6 to 20 to 1 as well as output speeds of 3 000 or 1 500 revolutions per minute are also feasible, in order to produce an alternating current at a frequency of 50 Hertz.

The bearings (5, 13) may be either sliding bearings or roller bearings.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. A generator drive for matching rotation speed of a gas turbine to an electricity generator, the generator drive comprising: a supporting wall having openings; a first epicyclic gear stage having planet gears and a sun wheel whereby drive from the gas turbine is introduced to the planet gears by the sun wheel; a second epicyclic gear stage having further planet gears and an annular gear; a common planet gear shaft on which the planet gears of the first gear stage and the further planet gears of the second gear stage are arranged; bushes insertable into the openings in the supporting wall, the planet gear shaft being pre-mounted in one of the bushes so that the bush is insertable into and mountable onto the supporting wall opening as a single unit complete with the planet gears and the further, planet gears; and a first bearing and a second bearing smaller than the first bearing arranged in the bush to support the planet gear shaft in the supporting wall, the planet gears and the further planet gears being arranged on the planet gear shaft at respective distances relative to the first bearing so that movements which result from circumferential forces about the bearing from the planet gears and the further planet gears substantially cancel one another out and so that the second bearing supports a smaller load than the first bearing.

2. A generator drive according to claim 1, wherein at least one oil supply hole and one circumferential groove are arranged in the supporting wall whereby the bushes can be supplied with lubricating oil and the lubricating oil can be passed through the at least one lubricating oil hole to bearing points and to the planet gears, the further planet gears and the sun wheel.

3. A generator drive according to claim 1, wherein three planet gears are provided in each of the two epicyclic gear stages, whereby an input rotation speed to the drive is approximately 55,000 revolutions per minute, and an output rotation speed of the drive is approximately 3,600 revolutions per minute.

* * * * *